Nov. 11, 1958   A. E. RINEER   2,859,638
FOOT PEDAL
Filed March 29, 1955

INVENTOR.
ARTHUR E. RINEER
BY
HIS ATTORNEYS

United States Patent Office 2,859,638
Patented Nov. 11, 1958

2,859,638

FOOT PEDAL

Arthur E. Rineer, Centerville, Ohio

Application March 29, 1955, Serial No. 497,487

7 Claims. (Cl. 74—594.4)

This invention relates to a bicycle pedal and more particularly to the structure thereof and the method of making same.

An object of this invention is to provide a bicycle pedal that requires few parts and few operations, so as to produce a pedal economically that is light in weight and at the same time efficient, sturdy and dependable.

Other objects and advantages reside in the construction of parts, the combination thereof and the mode of operation, as will become more apparent from the following description.

The bicycle pedal disclosed herein is an improvement upon the bicycle pedal disclosed in my United States Letters Patent No. 2,692,512 granted October 26, 1954.

In the drawings, Figure 1 is a plan view of a blank used in forming a part of the frame structure.

Figure 2 discloses the blank after it has been stamped so as to be formed into shape.

Figure 3 discloses an exploded view of the parts used in producing the pedal.

Figure 1:
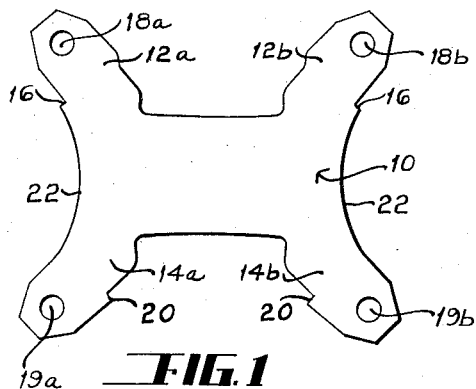

Referring to the drawings, the reference character 10 indicates a blank that is used in producing a housing for the bushing and as a frame for supporting the treads and the parts associated therewith. This blank 10 is provided with two legs 12a and 12b located on one side of the blank, there being one at each end of the blank, and a pair of legs 14a and 14b located on the opposite side of the main body of the blank, there being one adjacent each end. As may be clearly seen in Figure 1, the legs 12a and 12b have been provided with notches 16, there being one notch in each leg, and provided with apertures 18a and 18b respectively. The legs 14a and 14b have been provided with notches or shoulders 20 and provided with apertures 19a and 19b respectively. It is to be noted that the notches 16 interrupt an arcuate portion 22. The shoulders 20 are placed in the legs on the side opposite from the arcuate portions 22.

By placing the blank 10 in a forming die, one-half of the frame structure 30 is provided. This frame structure 30 is provided with a semi-cylindrical portion 32, legs 12a and 12b and legs 14a and 14b. The legs 14a and 14b are provided with shoulders 20. The notches 16 subtend the legs 12a and 12b. A flared portion 34 extends beyond the semi-cylindrical portion 32. This flared portion is used in giving rigidity to the angularly disposed portions of the legs 12a, 12b, 14a and 14b. Adjacent each end of the semi-cylindrical portion 32 is found a coined portion 36. The coined portions 36 provide limits for the bearing, in that the bearing is seated between the coined portions positioned near the end of the cylindrical cavity.

Figure 2:
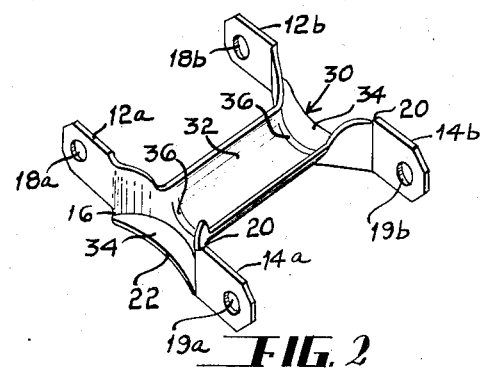
Figure 4:
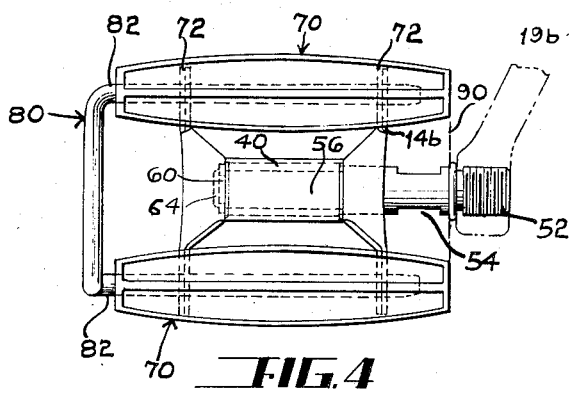
Figure 4 is a top plan view of the finished pedal.

As is apparent in Figures 2 and 4, the longitudinal margins of the semi-cylindrical portion 32 define a plane which bisects the legs 12a, 12b, 14a and 14b, these legs occupying planes normal to the plane defined by said longitudinal margins.

Figure 3:
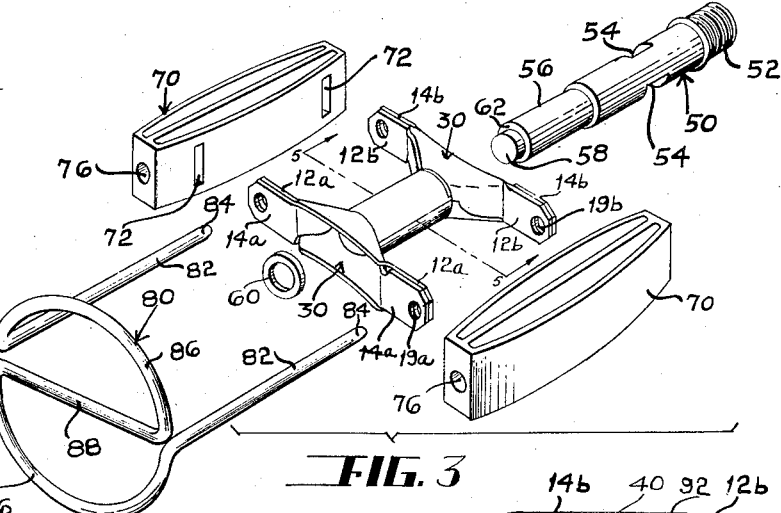

Two members 30 are mated, as shown in Figure 3. As clearly shown in this figure, the legs 14a and 14b are juxtaposed upon the legs 12a and 12b, the legs 14a and 14b forming the outer extremity of the extensions formed by the legs 12a and 12b and 14a and 14b. In other words, the distance between the legs 14a and 14b is greater than the distance between the legs 12a and 12b. To this end, the legs 12a and 12b on one side of each frame member 30 are off-set inwardly from the legs 14a and 14b on the opposite side.

Figure 5:
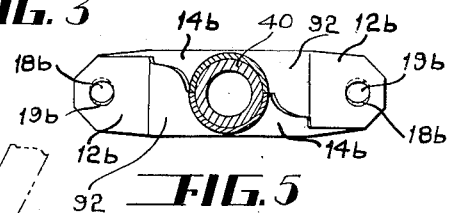
Figure 5 is a cross sectional view taken substantially on the line 5—5 of Figure 3.

The bushing or bearing 40 is positioned in the cylindrical cavity formed by the two frame structures or halves 30. The apertures 18a and 19a in the legs 12a and 14a respectively are aligned, so as to register. The apertures 18b and 19b may be slightly out of registry, as clearly shown in Figure 5. During the assembly of the two halves 30 and the bushing 40, powdered solder or fusing material, together with a powdered flux, is positioned between the bearing 40 and the two halves 30. The assembly is then heated to a temperature sufficient to solder or fuse the two halves 30 and the bushing 40 together. This temperature is lower than the temperature that has been used in molding and/or sintering the bearing 40 that is made from powdered material. The bearing is porous. As is well known to those skilled in the art, such porous bearings may be saturated with oil or the bearing may contain graphite functioning as a lubricant.

A spindle 50 is mounted in the bearing 40. This spindle 50 is provided with a threaded end 52 and a pair of flattened portions 54, diametrically disposed to form a wrench-engaging portion. The spindle 50 also includes a reduced cylindrical portion 56 terminating in a reduced cylindrical pintle 58. The portion 56 has a diameter slightly smaller than the inside diameter of the porous bearing 40. The spindle 50 is inserted through the bearing, so that the pintle 58 projects beyond the bearing 40. A washer 60 is placed upon the pintle 58 and engages a shoulder 62 of the spindle 50. The pintle 58 projects through the washer and is upset or swaged so as to form a head 64 engaging the washer 60 to lock the spindle in position. The spindle is free to rotate in the bearing or bushing 40.

A pair of rubber, neoprene or plastic tread members 70 is provided with notches 72, the distance between the notches 72 being equal to the spacing of the combined legs 12a—14a and the combined legs 12b—14b. The treads 70 are inserted upon the combined legs 12a—14b and the combined legs 12a—14a, as shown in Figure 4. Each of the treads 70 is provided with longitudinally extending holes or apertures 76. The apertures 76 extend into an end of each of the treads 70 and terminate in spaced relation from the opposite ends of the treads.

A member 80 is provided with a pair of prongs 82 extending parallel to each other. These prongs 82 are provided with tapered tip portions 84. The prongs 82 are held in fixed spaced relation by arcuate portions 86, one arcuate portion extending from each prong 82, and a transverse portion 88 that is substantially coplanar with the two prongs 82. The prongs 82 are first coated with an adhesive and then the prongs are projected into the apertures 76 through the apertures 18a and 19a in the first pair of combined leg portions 12a—14b. The prongs pass through the first pair of apertures 19a—18a rather freely in that these apertures are aligned. The prongs continue through the apertures 76, through the apertures 18b—19b in the second pair of combined leg portions 12b—14b. Due to the fact that the holes 18b—19b in the leg portions 12b—14b may not be in perfect registry, the tapered portions of the prongs 82 have to be forced through the two apertures, namely, through the apertures 18b in the legs 12b and through the apertures 19b in the legs 14b, so as to align these two apertures. As the prongs are forced through the second leg portions, these apertures 18b—19b are also aligned, the tension of the misaligned legs 12b—14b, when aligned with the apertures 18b—19b, binding or clamping the prongs into position when forced into the home position, as shown in Figure 4. This, together with the adhesive, holds the prongs in place. Instead of applying adhesive to the prongs, the apertures may be coated with adhesive. Thus, the pedal is completely assembled in readiness for use.

It is to be noted that the flattened portions 54, used as wrench-engaging portions, are located between the two treads 70. When the pedal is finally assembled, the tread portions 70 extend almost up to the line 90 extending from the extremities of the treads 70, thereby shortening the shank of the spindle from the conventional type of pedals, so as to reduce the amount of material required, reduce the weight and so as to provide a shorter shank obtaining greater rigidity.

For larger sizes of pedals a longer shank may be used. If plastic treads are used, then suitable dyes may be added to give the pedal a flashy appearance.

The overlapping arcuate portions 92 extending between the cylindrical portion and the leg portions 12a and 14a and 12b and 14b may be spot welded together, or fused together, so as to reinforce the fused cylindrical portions.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a bicycle pedal, a pair of similar sheet metal frame members, each frame member comprising an elongate semi-cylindrical portion having longitudinal margins defining a first plane, and a pair of legs projecting radially oppositely from each end of said semi-cylindrical portion, each said leg comprising a substantially flat sheet metal portion occupying a plane substantially normal to said first plane and being substantially bisected thereby, the legs at each end of said semi-cylindrical portion being off-set one from the other such that, upon the semi-cylindrical portions of said frame members being superimposed in mating opposing relation to form a cylinder, the legs of one frame member occupy positions adjacent and juxtaposed upon the complementary legs of the other frame member.

2. In a bicycle pedal, the pair of similar sheet metal frame members according to claim 1 wherein each frame member includes a flared portion disposed at each end of said semi-cylindrical portion, each said flared portion connecting and reinforcing the legs at its end of the semi-cylindrical portion.

3. A hub for a foot pedal, including a semi-cylindrical body member presenting elongated side edges in a common horizontal plane, an outwardly turned arm at each end of each of said side edges, the arms on one side edge of said member being spaced apart a greater longitudinal distance than the arms on the other side edge, the arms on each side edge having openings aligned with one another, the axes of said openings being in substantially the same horizontal plane with said edges, and a duplicate body member in opposed interfitting relation to the first said member with the shorter spaced arms of one member being received between the longer spaced arms of the other member in respective face abutting relation thereto and the longer spaced arms of said one member receiving the shorter spaced arms of the said other member therebetween in respective face abutting relation thereto, openings in interfitting arms being aligned with one another.

4. A hub according to the preceding claim, characterized in that said arms are spaced longitudinally from the ends of said semi-cylindrical body members, being connected thereto by angular web portions, the web portions of said members interfitting in accompaniment with interfitting of said arms, the interfitting web portions and arms resisting a separating motion of said body members in one direction and positively preventing such motion in other directions.

5. A fabricated sheet metal hub for a foot pedal, including a frame member having a semi-cylindrical body presenting elongated side edges in a common horizontal plane, an arm at each end of each of said side edges, said arms being laterally and longitudinally spaced from said side edges and occupying planes vertical to said common horizontal plane, inclined webs extending as extensions of said side edges to said arms uniting said arms with said body member, the webs extending from one side edge being shorter than the other webs whereby the arms at the ends of said one edge are longitudinally spaced apart a distance less than the spacing of the other arms, and a duplicate frame member in inverted superposed position on the first said member, said arms and said webs interfitting in vertical face abutting relation to define end mounting brackets for mounting treads thereto and said bodies mating to define a cylindrical bearing housing having a line of separation in its medial horizontal plane.

6. A fabricated sheet metal hub according to the preceding claim, characterized by openings in said arms located substantially in said common horizontal plane, said openings defining through passages in said brackets substantially in the medial horizontal plane of said housing for means mounting treads thereto.

7. A fabricated sheet metal hub according to the same preceding claim as for the immediately above claim, characterized in that the difference in longitudinal spacing of the arms at opposite side edges of the body is equivalent approximately to the thickness of two of said arms whereby interfitting face abutting arms may frictionally resist bodily separating motion of the frame elements, the interfitting arms and webs positively preventing relative sliding motion of said elements.

References Cited in the file of this patent

UNITED STATES PATENTS

| 366,279 | Torkelson | July 12, 1887 |
| 547,639 | Grubb | Oct. 8, 1895 |
| 1,974,247 | Musselman | Sept. 18, 1934 |
| 2,692,512 | Rineer | Oct. 26, 1954 |
| 2,706,418 | Liljenberg | Apr. 19, 1955 |

FOREIGN PATENTS

| 5,864 | Great Britain | of 1903 |
| 219,614 | Great Britain | July 31, 1924 |
| 432,338 | Germany | July 30, 1926 |